March 2, 1937.  A. W. KEEN ET AL  2,072,597
PASTE APPLYING APPARATUS
Filed May 8, 1936
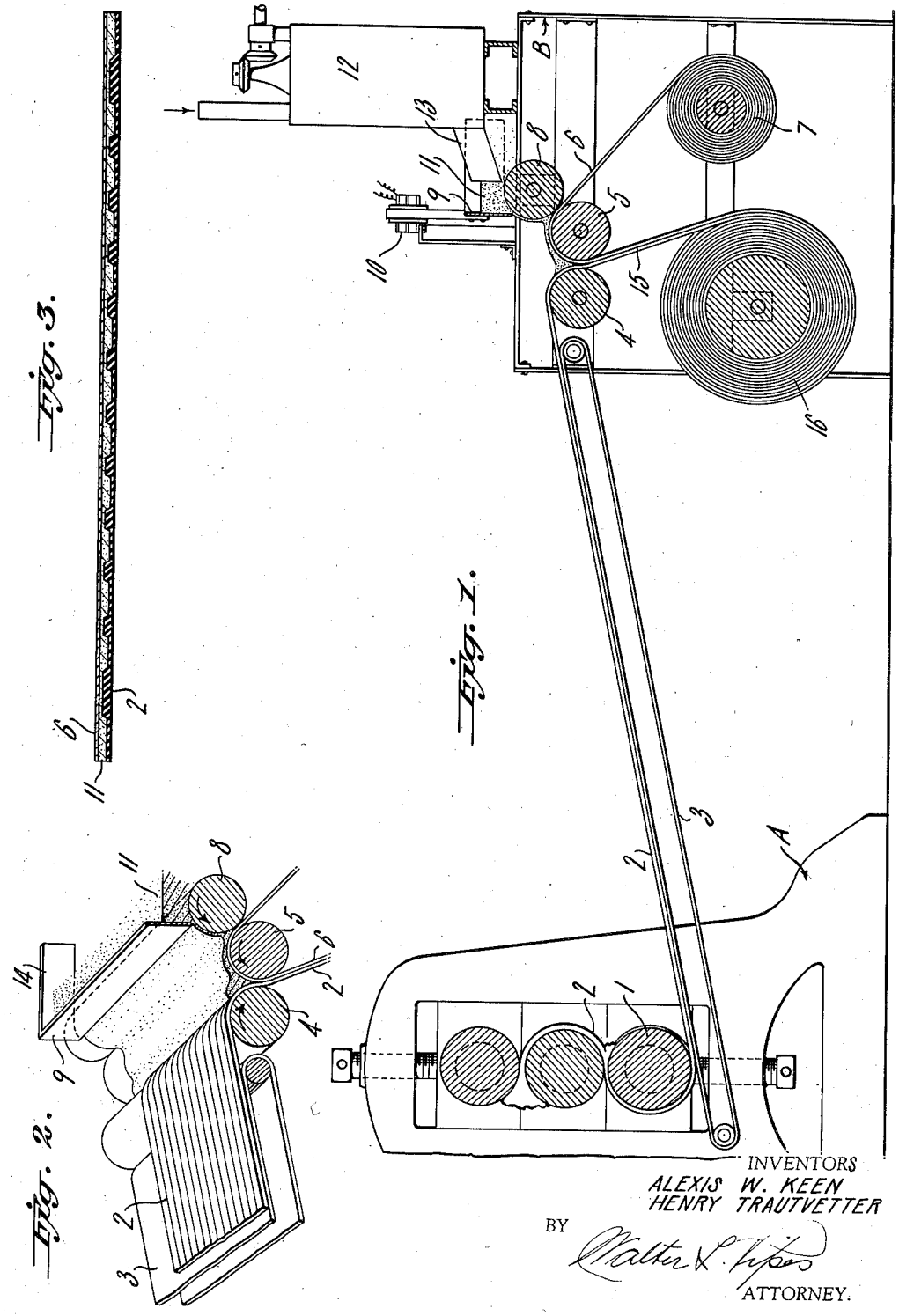
INVENTORS
ALEXIS W. KEEN
HENRY TRAUTVETTER
BY
ATTORNEY.

Patented Mar. 2, 1937

2,072,597

UNITED STATES PATENT OFFICE 2,072,597

PASTE APPLYING APPARATUS

Alexis W. Keen, Passaic, and Henry T. Trautvetter, Clifton, N. J., assignors to United States Rubber Products, Inc., New York, N. Y., a corporation of Delaware Application May 8, 1936, Serial No. 78,666

10 Claims. (Cl. 18—2)

This invention relates to apparatus for preparing and holding to shape patterned plastic articles prior to and while curing or setting them, and is more particularly concerned with means for applying a temporary matrix material to preshaped plastics bearing a predetermined and preformed relief design in the surface thereof.

An object of the invention is to provide a practical means for quantity production of such articles as ordinarily need confinement in a mold to preserve during the curing or setting operation, their preformed surface contours, whether embossed, extruded, cut, pressed, engraved or otherwise created thereon by any suitable means. Another object is to provide means for supplying and applying under uniform pressure a filling of paste or mud to the indentations or valleys of the preformed surface design carried by the plastic sheet. A further object is to provide means for creating a curing assembly comprising a preformed sheet of rubber composition and a temporary destructible matrix therefor, which assembly is adapted for the production of ribbed microporous hard rubber battery plate separators for electric storage batteries. Other objects will be apparent from the following description.

The accompanying drawing illustrates a preferred embodiment of the invention, usable in connection with the preparation of ribbed rubber battery plate separators.

Fig. 1 is a side view of an apparatus adapted to calender the plastic sheet material and impart a ribbed profile thereto, together with an apparatus for applying a paste to the ribbed face of the sheet;

Fig. 2 is a view in perspective of the clay paste applying mechanism;

Fig. 3 is a cross sectional view of the composite sheet curing assembly.

A is a profile calender having a grooved rotating roll 1 suitably geared to the other calender rolls, constituting means for sheeting and creating relatively raised and depressed surface areas in the plastic stock 2. In the case of separators so previously treated, the lands and webs indicated in profile in Fig. 3 represent such areas. A conveyor belt 3, driven by any suitable means, is supported near roll 1 so as to directly receive and convey the rubber sheet 2 containing desired vulcanizing ingredients to the paste-applying apparatus B; alternatively, conveyor 3 may comprise two or more belts travelling at successively decreasing speeds in order to compensate for and control the natural shrinking of the calendered sheet. Shrinkage stresses may also, if desired, be removed by annealing the sheet in a bath of hot water or air interposed in the path of the sheet between A and B. Continuous transmission of the sheet from A to B, with proper control of shrinkage, permits accurate control of the dimensions of the sheet, and further allows of successive operations on a continuous sheet with substantially no interruption from the time the stock is fed to the calender, resulting in uniformity and economy of production.

A pair of positively driven even speed rolls 4 and 5, which may be geared together, receive sheet 2 together with a liner 6. Rolls 4 and 5 are preferably driven by a variable speed drive mechanism so that their speed may be varied in accordance with the amount of shrinkage permitted in sheet 2. Liner 6 unwinds from a removable drum 7 and passes over the upper surface of roll 5 and down between rolls 4 and 5. An attenuator roll 8 is set against liner 6 and revolves in a direction opposed to the movement of 6. Roll 8 is geared to rolls 4 and 5, and may revolve at a greater surface speed than rolls 4 and 5 so as to give rise to a wiping action.

A doctor knife or blade 9 is suitably supported above roll 8 and may be vibrated by any desirable form of vibrator such as an electromagnetic vibrator 10. A clay paste 11 is uniformly mixed in a mixer 12 and delivered thru a valve or gateway 13 to the top surface of roll 8. Guides 14, one on each side of the doctor blade 9, which guides may be suitably attached to the doctor blade, are provided to confine and guide the movement of the paste. The rotating roll 8, revolving in the direction indicated, acts in conjunction with blade 9 to form an attenuated layer of the clay paste by dragging the slip to and under the edge of blade 9, which spreads the paste out thinly and evenly on the surface of roll 8 from which it is wiped in a layer of the desired thickness directly onto the moving liner 6. Vibration of the doctor blade prevents undue sticking of the paste to the blade and guides, and also assists in breaking the air bubbles.

The accumulated layer of paste on liner 6 is uniformly pressed into and over the ribbed face of the rubber sheet by the cooperation of rolls 4 and 5, sheet 2 and liner 6, and thus is formed the composite assembly 15 shown in detail in Fig. 3. A small bank of paste, controllable by adjustment of the clearance between knife 9 and roll 8, is allowed to accumulate in the bight of rolls 4 and 5 to insure a solid filling in of the valleys with the paste. Liner 6 is generally a fabric but may be made of any suitable material.

The assembly 15 is wound up under suitable tension on a removable drum 16, positively driven by any suitable means. The drum 16 and plied up uncured coated rubber sheet is then submerged in water,—preferably in the vulcanizer as a matter of convenience,—and heated therein, at a temperature well below the vulcanizing temperature of the stock and for a sufficient time to permit the abstraction of water by the rubber stock from the matrix to substantially reach equilibrium, concurrently with which the rubber sheet attains its maximum degree of swelling. The rubber is then cured under nonevaporative conditions by any convenient method such as by immersion in saturated steam or in heated water. When the final swelling treatment is carried out in the vulcanizer, the vulcanizing step is conveniently accomplished without transfer of the stock by raising the temperature of the water to a vulcanizing temperature. Thereafter the stock is unrolled and the clay is stripped or scraped and washed off from the cured rubber sheet.

As an alternative procedure, after the paste has been pressed onto the sheet 2 as above, the liner 6 may be stripped off and wound up on a separate drum, only the paste-coated rubber sheet being wound up on drum 16. The paste-coated sheet may also be cut to convenient lengths and cured flat, either singly or plied up in stacks, between smooth platens under light pressure.

It is important that the layer of clay paste 11 on liner 6 be sufficiently thin to allow elimination of air bubbles which are usually unavoidably incorporated during bulk mixing of such pastes. Although special air evacuation means may be applied to the paste, this additional expense is not necessary to the present set-up, since the mere smearing of the clay paste in a thin layer is found to remove air bubbles satisfactorily. Vibration of the knife blade 9 also assists in bursting the air bubbles. If not removed, these air bubbles would expand during the subsequent heating and pock the rubber surface to spoil the cured sheet.

The thickness of the layer of substantially air-free clay paste built up on liner 6, depends on the thickness of the paste layer spread by the knife 9, and on the ratio of the surface speed of roll 8 to that of liner 6; for example, a ratio of 4:1 has been found to be satisfactory. If a thinner layer is required to effectively burst substantially all air bubbles, the knife 9 is set to a smaller clearance and the surface speed of roll 8 relative to that of liner 6 must be further increased in order to provide sufficient paste for completely filling in the ribbed sheet 2.

The whole apparatus is operated with all moving parts suitably supported by upright standards or other form of support as will be apparent to those skilled in the art, and with such parts co-ordinating to allow a continuous shaping of the stock, filling up of the preformed design cavities with a layer of substantially air-free paste, and removal of the composite sheet from the zone of formation of the composite sheet.

It will be apparent that the apparatus may be used in applying other than clay paste. Any paste physically similar to clay may be used instead, other materials being, for example, chalk, whiting, infusorial earth, and the like. The preformed sheet may be formed of a plastic other than a rubber, and the final article may be other than a battery plate separator, although the invention is especially adapted therefor. Examples of other articles are flooring, tiling, door mats, floor mats, paneling, etc. whether of soft or hard rubber composition.

Having thus described our invention, what we claim and desire to protect by Letters Patent is:

1. In combination, means for producing on a plastic body predetermined relatively raised and depressed surface areas, and mechanical means for supplying and applying a temporary paste filling to the cavities formed by the depressed areas whereby to preserve the original surface contours prior to and during a subsequent setting of the plastic.

2. In combination, means for producing predetermined relatively raised and depressed surface areas on an uncured rubber body, mechanical means for supplying and applying under substantially uniform pressure a temporary paste filling to the said surface areas whereby to fill in the cavities and form an even coating over the sheet, and conveyor means for carrying the rubber body from said first means to said second means.

3. In combination, calender means for imparting a ribbed profile to an uncured sheet of rubber composition, mechanical means for supplying and applying under substantially uniform pressure a temporary paste filling to the ribbed face of the sheet whereby to fill in the valleys and form an even coating over the sheet, and conveyor means for carrying the ribbed sheet from said first means to said second means.

4. In combination, calender means for imparting a ribbed contour to an uncured sheet of rubber composition, mechanical means for supplying and applying under substantially uniform pressure a temporary paste filling to the ribbed face of the sheet in association with a retainer liner for the paste filling whereby to fill in the valleys and form an even flat coating over the sheet, and conveyor means for carrying the ribbed sheets from said first means to said second means.

5. In combination, calender means for imparting a ribbed contour to an uncured sheet of rubber composition, mechanical means for supplying and applying under substantially uniform pressure a temporary paste filling to the ribbed face of the sheet in association with a retainer liner for the paste filling whereby to fill in the valleys and form an even flat coating over the sheet, and conveyor means for carrying the ribbed sheet from said first means to said second means, and means for rolling up the composite sheet on a drum.

6. A temporary-matrix applying mechanism for preshaped uncured plastic articles bearing predetermined surface cavities comprising, in combination, means for attenuating a supply of paste in a thin layer whereby to effect removal of air bubbles, means for supplying and uniformly pressing the attenuated paste into said cavities to fill the cavities and form an even coating on said article, and means for holding said article in engaging relationship with said paste filling while it is being applied to said cavities, whereby to form a composite curing assembly.

7. A temporary-matrix applying mechanism for preshaped uncured plastic articles bearing predetermined surface cavities comprising, in combination, means for attenuating a supply of paste in a thin layer on a travelling surface whereby to effect removal of air bubbles, means including said travelling surface for supplying and uniformly pressing the attenuated paste into said cavities to fill the cavities and form an even surface on said article, and means for holding said article in engaging relationship with said paste filling while it is being applied to said cavities, whereby to form a composite curing assembly.

8. A temporary-matrix applying mechanism for uncured rubber sheeting bearing predetermined relatively raised and depressed surface areas which comprises, in combination, means including a doctor blade and an associated attenuator roll for attenuating a supply of paste in a thin layer, a fabric sheet adapted to receive said paste in thin layer form, a pair of closely adjacent rotatable rolls adapted to receive and press together between them, when rotating, the said uncured rubber sheeting and the fabric sheet bearing the paste as a filling for the cavities formed by the depressed areas of said rubber sheeting, whereby to form a composite curing assembly including the fabric sheet as a retaining liner for the paste filling.

9. A temporary-matrix applying mechanism for preshaped uncured plastic articles bearing predetermined surface cavities, comprising in combination, a doctor blade, means for feeding a supply of paste to the blade, means for dragging the paste against and past the blade whereby to attenuate the paste in the form of a thin layer, means for carrying the attenuated layer away from the proximity of said blade, means for uniformly pressing the attenuated paste into said cavities to fill the cavities and form an even coating on said article, and means for holding said article in engaging relationship with said paste filling while it is being applied to said cavities, whereby to form a composite curing assembly.

10. An apparatus for preparing a curing assembly for a sheet of a plastic embodying areas of relatively sharp and abrupt surface depressions, comprising two closely adjacent rotatable rolls adapted to receive between them said sheet, means for conveying the sheet to said rolls, means for supplying and uniformly pressing into said surface depressions a supply of a clay paste, while juxtaposed between said rolls, said second means including a retaining liner for the clay filling, whereby to level off and even the surface of the coating on said sheet and form a composite curing assembly of plastic sheet, paste filling, and retaining liner, means for continuously carrying out said operations until substantial lengths of the sheet have been so treated, and means for plying up the composite assembly on a drum.

ALEXIS W. KEEN.
HENRY T. TRAUTVETTER.